(12) United States Patent
Meredith et al.

(10) Patent No.: US 8,925,104 B2
(45) Date of Patent: Dec. 30, 2014

(54) EVENT DRIVEN PERMISSIVE SHARING OF INFORMATION

(75) Inventors: Sheldon Kent Meredith, Marietta, GA (US); Mario Kosseifi, Roswell, GA (US); John Pastore, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/447,069

(22) Filed: Apr. 13, 2012

(65) Prior Publication Data

US 2013/0276134 A1 Oct. 17, 2013

(51) Int. Cl.
*G06F 7/00* (2006.01)
*G06F 7/04* (2006.01)

(52) U.S. Cl.
USPC .................. 726/27; 726/4; 726/30; 707/783; 707/784; 707/787; 707/788

(58) Field of Classification Search
USPC ........ 726/21, 26–30, 2–4; 707/705, 736, 783, 707/784, 787, 788; 455/456.1, 456.2
See application file for complete search history.

(56) References Cited

U.S. PATENT DOCUMENTS

| | | |
|---|---|---|
| 5,515,062 A | 5/1996 | Maine et al. |
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,108,532 A | 8/2000 | Matsuda et al. |
| 6,108,556 A | 8/2000 | Ito |
| 6,148,219 A | 11/2000 | Engelbrecht et al. |
| 6,230,018 B1 | 5/2001 | Watters et al. |
| 6,256,577 B1 | 7/2001 | Graunke |
| 6,263,190 B1 | 7/2001 | Mamori et al. |
| 6,298,233 B1 | 10/2001 | Souissi et al. |
| 6,307,503 B1 | 10/2001 | Liu et al. |
| 6,311,078 B1 | 10/2001 | Hardouin et al. |

(Continued)

FOREIGN PATENT DOCUMENTS

| | | |
|---|---|---|
| EP | 0856746 A2 | 8/1998 |
| JP | 2004069609 A | 3/2004 |
| JP | 2007328050 A | 12/2007 |
| WO | WO2006031035 A1 | 3/2006 |

OTHER PUBLICATIONS

Janice Y. Tsai et al, Location-Sharing Technologies: Privacy Risks and Controls, pp. 1-26, Feb. 2010.*

(Continued)

*Primary Examiner* — David Garcia Cervetti
*Assistant Examiner* — Shanto M Abedin
(74) *Attorney, Agent, or Firm* — Amin, Turocy & Watson, LLP

(57) ABSTRACT

The disclosed subject matter provides for event driven permissive sharing of information. In an aspect, user equipment can include information sharing profiles that can facilitate sharing information with other devices or users, such as sharing location information. The information sharing profiles can include trigger values, such that when a target value transitions the trigger value, a permission value is updated to restrict access to sharable information. As such, event driven permissive sharing of information allows for designation of temporary friend information sharing with user-defined triggers.

20 Claims, 10 Drawing Sheets

(56) References Cited

U.S. PATENT DOCUMENTS

| | | |
|---|---|---|
| 6,317,686 B1 | 11/2001 | Ran |
| 6,330,459 B1 | 12/2001 | Chrichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,407,703 B1 | 6/2002 | Minter et al. |
| 6,429,815 B1 | 8/2002 | Soliman |
| 6,434,396 B1 | 8/2002 | Rune |
| 6,453,168 B1 | 9/2002 | McCrady et al. |
| 6,515,623 B2 | 2/2003 | Johnson |
| 6,522,296 B2 | 2/2003 | Holt |
| 6,526,335 B1 | 2/2003 | Treyz et al. |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,892,054 B2 | 5/2005 | Belcher et al. |
| 6,933,100 B2 | 8/2005 | Igawa et al. |
| 6,933,860 B1 | 8/2005 | Gehman et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 * | 12/2006 | Bloebaum et al. ........ 455/456.6 |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,432,829 B2 | 10/2008 | Poltorak |
| 7,436,794 B2 | 10/2008 | Takahashi et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,054,802 B2 | 11/2011 | Burgess et al. |
| 8,121,604 B1 | 2/2012 | Schwinghammer |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,307,030 B1 | 11/2012 | Hu |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,548,494 B2 | 10/2013 | Agarwal et al. |
| 8,594,700 B2 | 11/2013 | Nabbefeld |
| 8,666,388 B2 | 3/2014 | Catovic et al. |
| 8,666,390 B2 | 3/2014 | Meredith et al. |
| 2001/0047242 A1 | 11/2001 | Ohta |
| 2002/0059266 A1 | 5/2002 | I'anson et al. |
| 2002/0069312 A1 * | 6/2002 | Jones ........................... 711/100 |
| 2002/0077116 A1 | 6/2002 | Havinis et al. |
| 2002/0172223 A1 | 11/2002 | Stilp et al. |
| 2003/0092448 A1 | 5/2003 | Forstrom et al. |
| 2003/0097330 A1 | 5/2003 | Hillmer et al. |
| 2003/0115260 A1 | 6/2003 | Edge |
| 2003/0158924 A1 | 8/2003 | DeLegge |
| 2003/0222819 A1 | 12/2003 | Karr et al. |
| 2003/0225508 A9 | 12/2003 | Petzold et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0240839 A1 | 10/2006 | Chen et al. |
| 2006/0267841 A1 | 11/2006 | Lee et al. |
| 2006/0270419 A1 * | 11/2006 | Crowley et al. ............ 455/456.2 |
| 2006/0282660 A1 | 12/2006 | Varghese et al. |
| 2007/0001873 A1 | 1/2007 | Ishikawa et al. |
| 2007/0060130 A1 | 3/2007 | Gogic et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 * | 12/2008 | Greenberg .................... 455/557 |
| 2008/0311923 A1 | 12/2008 | Petrovic et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0131073 A1 | 5/2009 | Carlson et al. |
| 2009/0181695 A1 | 7/2009 | Wirola et al. |
| 2009/0260055 A1 * | 10/2009 | Parmar ............................. 726/1 |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0310501 A1 | 12/2009 | Catovic et al. |
| 2009/0327134 A1 | 12/2009 | Carlson et al. |
| 2010/0020776 A1 | 1/2010 | Youssef et al. |
| 2010/0054237 A1 | 3/2010 | Han et al. |

(56) References Cited

U.S. PATENT DOCUMENTS

| | | | |
|---|---|---|---|
| 2010/0058442 A1 | 3/2010 | Costa et al. | |
| 2010/0081389 A1 | 4/2010 | Lawrow | |
| 2010/0100732 A1 | 4/2010 | Hatakeyama et al. | |
| 2010/0113035 A1 | 5/2010 | Eskicioglu et al. | |
| 2010/0120447 A1 | 5/2010 | Anderson et al. | |
| 2010/0124931 A1 | 5/2010 | Eskicioglu et al. | |
| 2010/0135178 A1 | 6/2010 | Aggarwal et al. | |
| 2010/0144368 A1* | 6/2010 | Sullivan et al. | 455/456.2 |
| 2010/0159951 A1 | 6/2010 | Shkedi et al. | |
| 2010/0172259 A1 | 7/2010 | Aggarwal et al. | |
| 2010/0189236 A1 | 7/2010 | MacDonald | |
| 2010/0190509 A1 | 7/2010 | Davis et al. | |
| 2010/0195566 A1 | 8/2010 | Krishnamurthy et al. | |
| 2010/0203903 A1 | 8/2010 | Dingler et al. | |
| 2010/0207470 A1 | 8/2010 | Kim et al. | |
| 2010/0220665 A1 | 9/2010 | Govindan et al. | |
| 2010/0222075 A1 | 9/2010 | Miura | |
| 2010/0227589 A1 | 9/2010 | Cook et al. | |
| 2010/0250542 A1 | 9/2010 | Fujimaki | |
| 2010/0299060 A1* | 11/2010 | Snavely et al. | 701/201 |
| 2010/0311437 A1 | 12/2010 | Palanki et al. | |
| 2010/0313157 A1 | 12/2010 | Carlsson et al. | |
| 2011/0009068 A1 | 1/2011 | Miura | |
| 2011/0010085 A1 | 1/2011 | Tanaka et al. | |
| 2011/0023129 A1* | 1/2011 | Vernal et al. | 726/28 |
| 2011/0053609 A1 | 3/2011 | Grogan et al. | |
| 2011/0060808 A1 | 3/2011 | Martin et al. | |
| 2011/0065450 A1 | 3/2011 | Kazmi | |
| 2011/0072034 A1 | 3/2011 | Sly | |
| 2011/0076975 A1 | 3/2011 | Kim et al. | |
| 2011/0077032 A1 | 3/2011 | Correale et al. | |
| 2011/0161261 A1 | 6/2011 | Wu et al. | |
| 2011/0164596 A1 | 7/2011 | Montemurro et al. | |
| 2011/0171912 A1 | 7/2011 | Beck et al. | |
| 2011/0172905 A1 | 7/2011 | Schroder et al. | |
| 2011/0205964 A1 | 8/2011 | Fix et al. | |
| 2011/0207470 A1 | 8/2011 | Meredith et al. | |
| 2011/0210843 A1 | 9/2011 | Kummetz et al. | |
| 2011/0210849 A1 | 9/2011 | Howard et al. | |
| 2011/0244879 A1 | 10/2011 | Siomina et al. | |
| 2011/0256874 A1 | 10/2011 | Hayama et al. | |
| 2011/0271331 A1 | 11/2011 | Adams | |
| 2011/0296169 A1 | 12/2011 | Palmer | |
| 2011/0319098 A1* | 12/2011 | Potorny et al. | 455/456.2 |
| 2012/0016902 A1* | 1/2012 | Ranjan et al. | 707/769 |
| 2012/0025976 A1 | 2/2012 | Richey et al. | |
| 2012/0028650 A1 | 2/2012 | Cooper et al. | |
| 2012/0030083 A1 | 2/2012 | Newman et al. | |
| 2012/0052884 A1 | 3/2012 | Bogatin | |
| 2012/0062415 A1 | 3/2012 | Hwang et al. | |
| 2012/0087338 A1 | 4/2012 | Brandt et al. | |
| 2012/0139782 A1 | 6/2012 | Gutt et al. | |
| 2012/0158289 A1 | 6/2012 | Bernheim Brush et al. | |
| 2012/0182874 A1 | 7/2012 | Siomina et al. | |
| 2012/0287911 A1 | 11/2012 | Takano et al. | |
| 2012/0317500 A1* | 12/2012 | Kosseifi et al. | 715/753 |
| 2012/0323703 A1 | 12/2012 | Hillier et al. | |
| 2013/0007058 A1 | 1/2013 | Meredith et al. | |
| 2013/0023237 A1 | 1/2013 | Meredith et al. | |
| 2013/0023274 A1 | 1/2013 | Meredith et al. | |
| 2013/0023281 A1 | 1/2013 | Meredith et al. | |
| 2013/0281111 A1 | 10/2013 | Syrjarinne et al. | |
| 2013/0324149 A1 | 12/2013 | Fix et al. | |
| 2014/0062782 A1 | 3/2014 | Abraham | |
| 2014/0171060 A1 | 6/2014 | Cook et al. | |

OTHER PUBLICATIONS

Nan Li et al, Sharing Location in Online Social Networks, pp. 20-25, IEEE Network, Oct. 2010.*

Janice Y. Tsai et al, Who's Viewed You? The Impact of Feedback in a Mobile Location-Sharing Application, pp. 2003-2012, CHI 2009—Security and Privacy, ACM, 2009.*

Janice Y Tsai et al, Who's Viewed You? The Impact of Feedback in a Mobile Location-Sharing Application, ACM, 2009.*

"Locate your friends in real time with Google Latitude". http://googlemobile.blogspot.com/2009/02/locate-your-friends-in-real-time-with.html. Last accessed Mar. 8, 2012, 23 pages.

"Location sharing and updating". http://support.google.com/mobile/bin/answer.py?hl=en&answer=136647. Last accessed Mar. 8, 2012, 3 pages.

"Privacy Settings". http://support.google.com/mobile/bin/answer.py?hl=en&answer=136650, Last accessed Mar. 8, 2012, 1 page.

Notice of Allowance mailed Aug. 12, 2013, for U.S. Appl. No. 13/174,541, 40 pages.

Final Office Action dated Aug. 2, 2013, for U.S. Appl. No. 13/188,295, 26 pages.

Final Office Action dated Aug. 2, 2013, for U.S. Appl. No. 13/188,300, 38 pages.

Non-Final Office Action dated Jun. 20, 2013, for U.S. Appl. No. 13/219,911, 61 pages.

Non-Final Office Action dated Jul. 17, 2013, for U.S. Appl. No. 13/188,345, 27 pages.

Non-Final Office Action dated Jun. 20, 2013, for U.S. Appl. No. 13/291,917, 52 pages.

Non-Final Office Action dated May 31, 2013, for U.S. Appl. No. 13/523,770, 40 pages.

Non-Final Office Action dated Sep. 19, 2013, for U.S. Appl. No. 13/927,020, 30 pages.

Non-Final Office Action dated Oct. 2, 2013 for U.S. Appl. No. 12/958,146, 31 pages.

Non-Final Office Action dated Sep. 26, 2013 for U.S. Appl. No. 13/284,456, 58 pages.

RouteFinder 3.00 for ArGIS Documentation, 2007, Routeware and Higher Mapping Solutions, 71 pages, published online at [http://www.routeware.dk/download/routefinder_arcgis.pdf], retrieved on Sep. 26, 2013.

mySociety (Web page), "More travel-time maps and their uses", 2007, downloaded from http://www.mySociety.org/2007/more-travel-maps/, 10 pages total (including a single page Examiner's attachment showing the operation of the interactive travel-time map), retrieved on Sep. 18, 2013.

Wayback machine archive from Jan. 21, 2009 of the mySociety Web page, "More travel-time maps and their uses", downloaded on Sep. 18, 2013 from http://web.archive.org/web/20090121193615/http://www.mysociety.org/2007/more-travel-maps/, 11 pages.

Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.

Non-Final Office Action dated Nov. 5, 2013 for U.S. Appl. No. 13/188,136, 47 pages.

Final Office Action dated Sep. 18, 2013, for U.S. Appl. No. 13/284,497, 30 pages.

Final Office Action dated Aug. 22, 2013, for U.S. Appl. No. 13/277,595, 36 pages.

Final Office Action dated Oct. 21, 2013, for U.S. Appl. No. 13/523,770, 24 pages.

Office Action dated Nov. 5, 2013 for U.S. Appl. No. 13/188,345, 30 pages.

Non-Final Office Action dated Dec. 11, 2013, for U.S. Appl. No. 13/188,295, 52 pages.

Non-Final Office Action dated Dec. 24, 2013, for U.S. Appl. No. 13/188,300, 44 pages.

Final Office Action dated Dec. 11, 2013, for U.S. Appl. No. 13/291,917, 34 pages.

Final Office Action dated Jan. 15, 2014 for U.S. Appl. No. 13/219,911, 38 pages.

Final Office Action dated Jan. 28, 2014, for U.S. Appl. No. 12/958,146, 24 pages.

Notice of Allowance dated Feb. 14, 2014 for U.S. Appl. No. 13/284,456, 30 pages.

Final Office Action dated Feb. 24, 2014, for U.S. Appl. No. 13/927,020, 18 pages.

Office Action dated May 21, 2013 for U.S. Appl. No. 13/305,276, 28 pages.

(56) References Cited

OTHER PUBLICATIONS

Office Action dated Oct. 24, 2012 for U.S. Appl. No. 13/305,276, 37 pages.
Rabinowitz, et al., A new positioning system using television synchronization signals, IEEE Transactions on Broadcasting, vol. 51(1), p. 51-61, Mar. 2005.
Interview Summary dated Feb. 3, 2014 for U.S. Appl. No. 13/188,136, 10 pages.
Office Action dated Dec. 30, 2013 for U.S. Appl. No. 13/305,267, 10 pages.
Marko Silventoinen, Timo Rantalainen, "Mobile Station Locating in GSM" Helsinki, Finland, Last accessed on Nov. 15, 2011, 7 pages.
Office Action dated Feb. 5, 2014 for U.S. Appl. No. 13/526,988, 56 pages.
Smith, et al., "Airsage Overview", (http://mikeontraffic.typepad.com/files/raleigh-winter-2011-presentation-v11-final.pdf) Retrieved on Sep. 29, 2012, 39 pages.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
3GPP TS 25.413 V6.9.0 (Mar. 2006) UTRAN Iu interface RANAP signalling.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements.
3GPP TS 25.331 V6.9.0 (Mar. 2006) RRC protocol for the UE-UTRAN radio interface.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages."
"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholar.google.com/scholar?q=%22Support+Vector+Regression+Machines.%22. Last accessed Dec. 24, 2010, 7 pages."
Suykens et al., "Least squares support vector machine classifiers", Neural Processing Letters, vol. 9, No. 3, Jun. 1999, pp. 293-300.
Ferris et al. "Interior-point methods for massive support vector machines". SIAM Journal on Optimization 13: 783-804, (2002). doi:10.1137/S1052623400374379. Published electronically Jan. 3, 2003.
Meyer et al. "The support vector machine under test." Neurocomputing 55(1-2): 169-186, Sep. 2003.
International Search Report for PCT Application No. US2011/026122, dated Sep. 10, 2011, 11 pages.
International Search Report for PCT Application No. US2011/026120, dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010, last accessed Jul. 18, 2011.
Fleishman. Using the Personal Hotspot on your AT & T iPhone. Published online Mar. 15, 2011. http://www.macworld.com/article/158556/2011/03/personal_hotspot_att..., 4 pages.
Fleischfresser. Never Stop at a Red-Light Again. Published online Aug. 30, 2011. http://www.smartplanet.com/blog/..., 2 pages.
Cellphone Networks and the Future of Traffic. Published online Mar. 2, 2011. http://m.wired.com/autopia/2011/03/cell-phone-networks-and-the-future-... 15 pages.
Intelligent Transportation System. Published online http://en.wikipedia.org/wiki/Intelligent_transportation_system, retrieved Aug. 15, 2011, 7 pages.
Koukoumidis Emmanouil, Peh Li-Shiuan, Martonosi Margaret, SignalGuru: Leveraging Mobile Phones for Collaborative Traffic Signal Schedule Advisory. MobiSys'11, Jun. 28-Jul. 1, 2011, Bethesda, Maryland, USA. 14 pages.
Bitcarrier Technology. Published online at http://www.bitcarrier.com/technology. Retrieved Aug. 15, 2011, 1 page.
Hao Peng, Ban Xuegang(Jeff). Estimating Vehicle Position in a Queue at Signalized Intersections Using Simple Travel Times from Mobile Sensors. Retrieved Nov. 18, 2011. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
"DriveAssist—FAQ and Supported Devices" by Aegis Mobility, retrieved on Aug. 30, 2012 from the Wayback Machine archive dated Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.

(56) References Cited

OTHER PUBLICATIONS

Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Office Action dated Apr. 8, 2014 for U.S. Appl. No. 13/175,199, 52 Pages.
Office Action dated Apr. 23, 2014 for U.S. Appl. No. 13/291,917, 29 Pages.
Final Office Action dated Apr. 3, 2014 for U.S. Appl. No. 13/188,295, 37 pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, retrieved on May 9, 2014, 3 pages.
Represent (2000). In Collins English dictionary. Retrieved on May 9, 2014 from from http://search.credoreference.com/content/entry/hcengdict/represent/0, 2 pages.
Represent. (2001). In Chambers 21 st century dictionary. Retrieved on May 9, 2014 from from http://search.credoreference.com/content/entry/chambdict/represent/O.
Represent. (2011). In the american heritage dictionary of the english language. Retrieved on May 9, 2014 from from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug, 8, 2014 for U.S. Appl. No. 13/284,497, 48 pages.
Office Action dated Aug. 11, 2014 for U.S. Appl. No. 14/279,176, 22 pages.
Office Action dated Oct. 22, 2014 for U.S. Appl. No. 13/557,425, 59 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.

\* cited by examiner

EVENT DRIVEN PERMISSIVE SHARING OF INFORMATION

TECHNICAL FIELD

The disclosed subject matter relates to permissive sharing of information and, more particularly, to event driven permissive sharing of information.

BACKGROUND

By way of brief background, sharing of information, such as location information for mobile devices, with other parties has included granting permission to share that information. As an example, a user can designate other users as 'friends'. These other friends would then be permitted to access designated shared information.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a system can include a memory and processor. The processor can facilitate the execution of computer-executable instructions stored on the memory. The execution of the computer-executable instructions can cause the processor to receive input for an information sharing profile. The processor can further assign values to a trigger value of the information sharing profile. Moreover, the processor can assign a value in the information sharing profile designating sharable information. Additionally, the processor can assign a value of the information sharing profile, the value relating to target users or target devices of the sharable information. Moreover, the processor can facilitate access to the information sharing profile.

In another embodiment, a method can include accessing, by a system, a sharing profile. The method can further include designating permission value based on a trigger value, an information sharing designation value, and an identification value of the sharing profile. Moreover, the method can facilitate access to information associated with the information sharing designation value of the sharing profile based on the permission value.

In a still further embodiment, a mobile device can include a memory storing computer-executable instructions and a processor that facilitates execution of the computer-executable instructions. These instructions can cause the processor to receive input for an information sharing profile. The processor can then assign a trigger value, wherein a target value transitioning the trigger value is associated with restricting the sharing of designated information. The processor can further assign a value that designates information as information for sharing with select devices or users. The processor can also assign a value corresponding to the selection of devices or users that can be allowed access to the designated information. Further, the processor can facilitate access to the information sharing profile. Moreover, the processor can restrict access to designated information based on predetermined privacy criteria.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the drawings.

DETAILED DESCRIPTION

Figure 1:
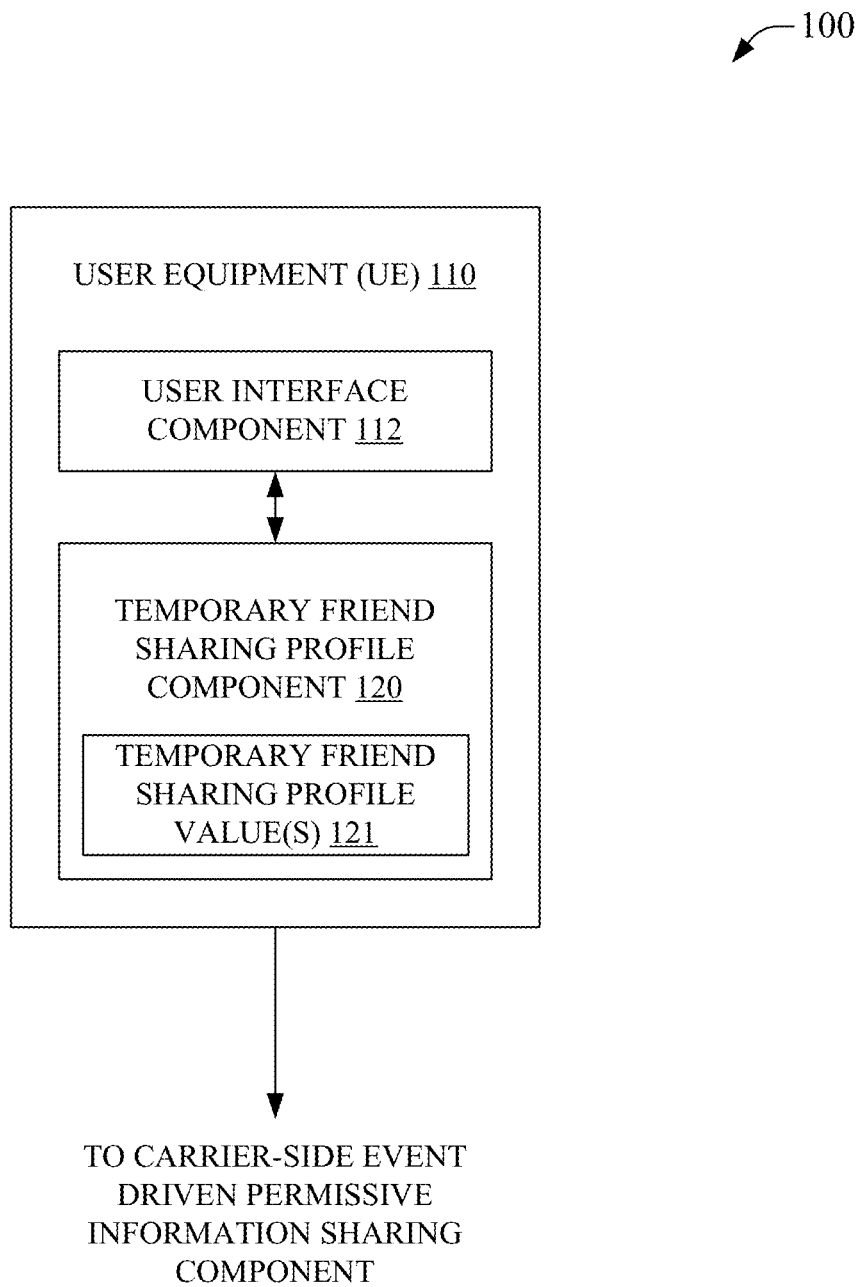
FIG. 1 is an illustration of a system that facilitates event driven permissive sharing of information in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates event driven permissive sharing of information in accordance with aspects of the subject disclosure. System 100 can include user equipment (UE) 110. UE 110 can include a user interface (UI) component 112. UI component 112 can be, for example, a touch screen interface on a mobile device, a display and discrete keypad on a laptop computer, a screen and a mousing device on a smartphone, etc.

System 100 can further include temporary friend sharing (TFS) profile component 120. TFS profile component 120 can be included in UE 110. TFS profile component 120 can be communicatively coupled with UI component 112. As such, UI component 112 can be employed to interact with TFS profile component 120. TFS profile component can further include TFS profile value(s) 121. TFS profile value(s) 121 can include values composing a TFS profile. The TFS profile, at least in part, can include values associated with event driven permissive sharing of information. The TFS profile can be a set of values that includes one or more subsets of values that can comprise the same, partially the same, or different values. UE 110 can facilitate access to TFS profile value(s) 121 by carrier-side event driven permissive information sharing components, wherein carrier-side indicates that the component is part of the carrier network or closely associated therewith.

TFS profile component 120 can facilitate a user designating aspects of a TFS profile. The TFS profile can be stored on UE 110 or can be stored on a remote system, such as a carrier-side component. TFS profile can include designation of trigger event value(s), by way of TFS profile value(s) 121. A trigger event value can be correlated with automatically transitioning between permitting sharing of designated information and restricting sharing of designated information. As an example, where sharing location information is associated with a temporal trigger event value, sharing of the location information can occur before the trigger time is reached and sharing of the location information can be restricted after the trigger time is reached. As such, TFS profile component 120 can facilitate temporary sharing of location information.

Moreover, TFS profile can also include the designation of what information can be shared. TFS profile can include designation of shared information designation value(s), by way of TFS profile value(s) 121. A shared information designation value can be associated with identification of specific information or types of information that can be accessed in accordance with the TFS profile. While nearly any type of information can be shared, specific non-limiting examples of information that can be shared can include location information, mood, status, contact information, address book information, device information, profile information, program data, etc. As a more specific non-limiting example, a user can designate by way of TFS profile component 120 that the UE location, address book, and Shared_Ideas.doc file can be shared where the trigger event value has not been transitioned.

Furthermore, TFS profile can include the designation of access permissions. Access permissions can designate the identification of systems or users that can access shared information where the trigger event value has not been transitioned. As such, a user can designate, by way of TFS profile value(s) 121, another user or device as a permitted to access shared information. As an example, a user can designate that her husband can access shared information from any other device. As a second example, a user can designate that anyone can access shared information from a single terminal at his place of employment, such as by designating a specific static IP address, MAC address, stored key, etc. As a third example, a user can designate that his mom or dad can access shared information from their smartphones. Numerous other examples are within the scope of the present disclosure but are not recited for clarity and brevity.

In a further aspect, other TFS profile value(s) 121 can be designated. Other TFS profile value(s) 121 can be nearly any type of value. As an example, TFS profile value(s) 121 can be associated with predefined event driven permissive information sharing schemes to facilitate simple selection of predefined values through selection of a scheme, such as a 'professional scheme', a 'non-professional scheme', a 'family scheme', etc. In another example, TFS profile value(s) 121 can be associated with levels of granularity for data sharing, such as, sharing location information restricted to a city level, street level, address level, radius level, etc. As a further example, TFS profile value(s) 121 can be associated with hierarchical event driven permissive information sharing, such as, designating that the types of information to be shared should mirror that shared by the party being shared with, designating that a second user can designate a third user to share your information with but only at a more restricted level, etc.

In another aspect, TFS profile component 120 can be communicatively coupled with other UE 110 components to facilitate integration of shared information. As an example, where a first user can designate that he will share his UE location with a second user until April 7, this information can be shared with the first user's UE address book component such that the address card for the second user indicates that the 'friend' status will automatically terminate on April 7. As a second example, an application on a UE related to building and reflecting of social networks or social relations among people, who, for example, share interests and/or activities (a 'social networking application'), can be communicatively coupled with TFS profile component 120. Continuing the example, where a first user designates the same second user as a temporary friend more than three times, the social networking application can query the first user about adding the second user as a 'long term friend' in said social networking application.

Figure 2:
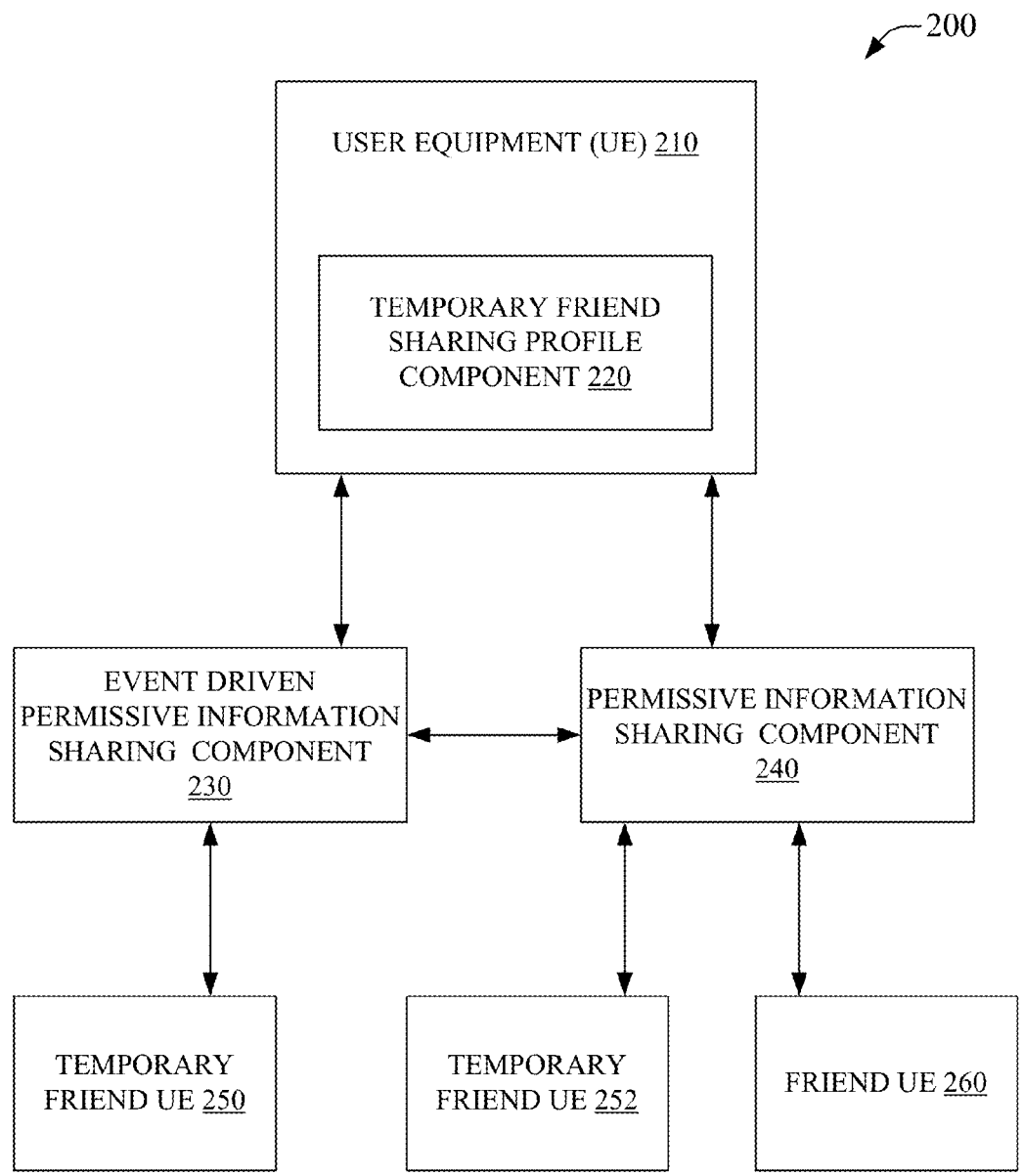
FIG. 2 is a depiction of a system that facilitates event driven permissive sharing of information in accordance with aspects of the subject disclosure.

FIG. 2 is a depiction of a system 200 that can facilitate event driven permissive sharing of information in accordance with aspects of the subject disclosure. System 200 can include UE 210. UE 200 can comprise TFS profile component 220. TFS profile component 220 can designate aspects of a TFS profile. The TFS profile can be stored on UE 210 or can be stored on a remote system, such as a carrier-side component. UE 210 can be communicatively coupled with event driven permissive information sharing component 230 to facilitate event driven permissive sharing of information in accordance with aspects of the subject disclosure.

UE 210 can also be communicatively coupled with permissive information sharing component 240, to facilitate non-event driven permissive sharing of information that comports with more conventional information sharing systems, thereby facilitating backwards-compatibility for legacy support of more conventional systems. As such, permissive information sharing component 240 can be communicatively coupled to Friend UE 260. Friend UE 260 can access information shared under more conventional information sharing systems and, as such, would be associated with non-event driven permissions. As an example, UE 210 can acknowledge a friend relationship associated with sharing location information between UE 210 and Friend UE 260 by way of permissive information sharing component 240 wherein, without further user action, it would be expected that sharing location information would continue over the long term.

In an aspect, event driven permissive information sharing component 230 can be communicatively coupled to permissive information sharing component 240. As such, event driven permissive information sharing component 230 can interact with permissive information sharing component 240 to create a more conventional 'long term' friend relationship by way of permissive information sharing component 240. Further, event driven permissive information sharing component 230 can interact with permissive information sharing component 240 to automatically alter or remove the more conventional 'long term' friend relationship by way of permissive information sharing component 240, thus, in a manner, acting as a surrogate actor for a user of UE 210. As such, in some embodiments, the event driven process can at least create, alter, and destroy a conventional friend relationship to allow the use of event-driven relationship, e.g., temporary friend relationships, on legacy systems. As such, permissive information sharing component 240 can also be communicatively to temporary friend UE 252. When a trigger event value has been transitioned event driven permissive information sharing component 230 can automatically alter or destroy the conventional friend relationship by way of permissive information sharing component 240 to restrict information sharing with temporary friend UE 252. In an embodiment, permissive information sharing component 240 can be a carrier-side component.

In a further aspect, event driven permissive information sharing component 230 can be communicatively coupled to temporary friend UE 250. As such, shared information can be accessed by temporary friend UE 250 while a trigger event value has not been transitioned. When the trigger event value has been transitioned, information sharing can be automatically restricted. In an embodiment, event driven permissive information sharing component 230 can be a carrier-side component.

In an aspect, TFS profile component 220 can be the same as or similar to TFS profile component 120. As such, TFS profile component 220 can facilitate a user designating aspects of a TFS profile, such as designating an event driven relationship between UE 210 and temporary friend UE 250, temporary friend UE 252, etc. Each event driven relationship can be associated with a trigger event value facilitating automatic updating of the status of the event-driven relationship. This can facilitate formation of temporary friend relationships that can automatically expire in response to the trigger event occurring. TFS profile component 220 can also facilitate the designation of what information can be shared, such as sharing of limited sets of information with temporary friends. Furthermore, a TFS profile can include the designation of access permissions to facilitate the sharing information with designated UEs or Users.

Figure 3:
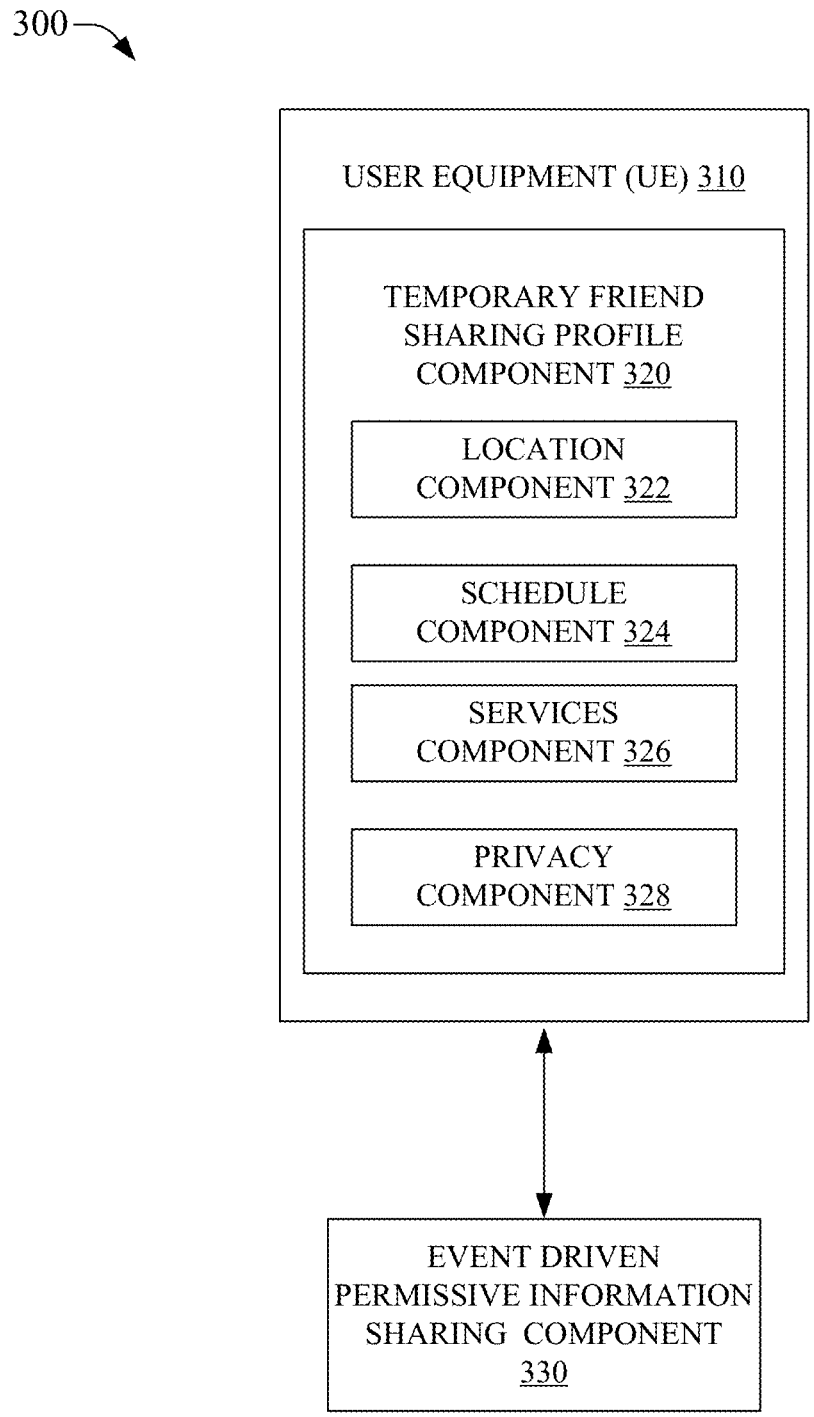
FIG. 3 illustrates a system that facilitates event driven permissive sharing of information in accordance with the disclosed subject matter.

FIG. 3 illustrates a system 300 that facilitates event driven permissive sharing of information in accordance with aspects of the subject disclosure. System 300 can include UE 310. UE 310 can include TFS profile component 320. UE 310 can be communicatively coupled with event driven permissive information sharing component 330. In some embodiments TFS profile component 320 can be the same as or similar to TFS profile component 120 or 220. As such, TFS profile component 320 can facilitate a user designating aspects of a TFS profile by way or UE 310, such as designating an event driven relationship. Event driven relationships can be associated with a trigger event value facilitating automatic updating of the status of the event-driven relationship. TFS profile component 320 can also facilitate the designation of access permissions, such as those related to the sharing information with designated UEs or Users. Furthermore, TFS profile component 320 can facilitate the designation of what information can be shared, such as sharing of limited sets of information with temporary friends.

In an aspect, TFS profile component 320 can facilitate designation of location information as shareable information by way of location component 322. Location component 322 can facilitate designating what location information is accessible in a temporary friend relationship prior to the trigger event occurring. Sharing location information can be designated to only include certain types of information, location information at certain levels of granularity, sharing location information only during scheduled times, etc. As an example, location component 322 can facilitate designating sharing of location information no finer than the city level between the hours of 9 am and p.m., Monday to Friday.

In a further aspect, TFS profile component 320 can facilitate designation of schedule information as shareable information by way of schedule component 324. Schedule component 324 can facilitate designating what schedule information is accessible in an event driven relationship prior to a trigger event occurring. Schedule information can be related to a user's schedule, such as appointments and events. Shared schedule information can be limited by schedule component 324, for example by limiting sharing to title only, e.g., event details are not shared; by sharing select classes of schedule information, e.g., work schedule can be shared but personal schedule is not shared; by sharing schedule information for only certain time periods, e.g., sharing the schedule from 9 am,-5 pm, Monday to Friday but restricting access to all other periods, etc. As an example, schedule component 324 can facilitate designating sharing of schedule information from a work schedule only and only from the date the event driven relationship was created and only up to the anticipated expiration date of the event driven relationship where the trigger is a date trigger.

In another aspect, TFS profile component 320 can facilitate designation of services information as shareable information by way of services component 326. Services component 326 can facilitate designating what services information is accessible in an event driven relationship prior to a trigger event occurring. Services information can include any information associated with services running on UE 310. A service can include software in execution or software accessing services associated with UE 310. As such, services can include email, text messaging, SMS service, GPS applications, word processor applications, spreadsheet applications, digital music applications, etc. Sharing information associated with services can facilitate sharing service data or data accessed by a service. As an example, services component 326 can facilitate designating sharing of services information for a digital music service allowing, for instance, sharing of what music is currently playing or sharing of music from a digital music library associated with the digital music service. As a second example, s component 326 can facilitate designating sharing of services information for a digital camera application of UE 310 facilitating access to photographs taken by the digital camera application until a trigger event occurs.

TFS profile component 320 can further include privacy component 328. Privacy component 328 can facilitate restricting access to information that can otherwise be permissible by other components of TFS profile component 320. Privacy component 328 can analyze, for example, information before allowing access to the information from another device or user in an event driven relationship with UE 310. As an example, UE 310 can be in an event driven information sharing relationship with another UE that allows sharing of audio recordings made with UE 310. Continuing the example, privacy component 328 can include restriction of access to information related to UE 310 user's family. Where a recoding is accidentally made of a phone call with UE 310 the user's wife, privacy component 328 can restrict access to that recording where it otherwise might have been made accessible under the event driven information sharing relationship.

Figure 4:
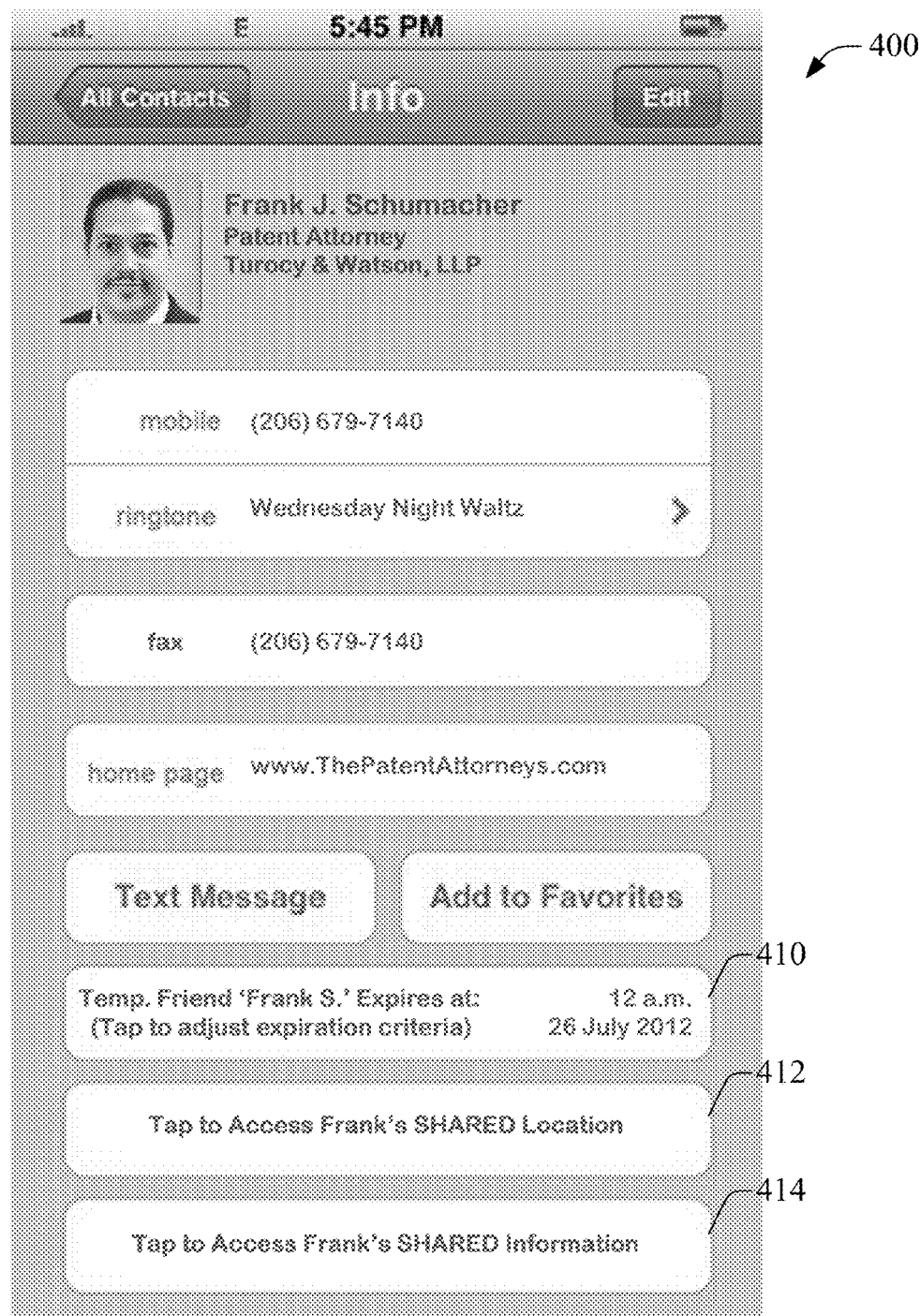
FIG. 4 is a depiction of a user interface that facilitates event driven permissive sharing of information in accordance with aspects of the subject disclosure.

FIG. 4 is a depiction of an exemplary user interface 400 that facilitates event driven permissive sharing of information in accordance with aspects of the subject disclosure. User interface 400 can be an interface related to interacting with data for a contact. The contact can include a name, title, company, phone number, etc., as is common in the art. The contact user interface can further include actions associated with interacting with the contact, such as starting a text messaging procedure when "text message" is selected on the contact user interface 400, as is common in the art. The contact user interface 400 can further include a first information and interaction segment 410. The first information and interaction segment 410 can present information related to an event driven permissive information sharing relationship. As an example, the first information and interaction segment 410 illustrates that a trigger has been set for 12 a.m. on 26 Jul. 2012. The first information and interaction segment 410 also illustrates that the trigger can be altered, which can be initiated by tapping the first information and interaction segment 410 where user interface 400 includes a touch screen interface.

Further actions can be induced by taping on, for example, a second information and interaction segment 412. The second information and interaction segment 412 can be related to an action for accessing shared location information. The shared location information can be location information designated for sharing where a trigger value has not been transitioned. Other information designated for sharing can be accessed, for example, by taping on a third information and interaction segment 414. The third information and interaction segment 414 can be related to an action for accessing other types of designated shared information. Other information designated for sharing, can include, for example, schedule information, services information, etc. Exemplary user interface 400 in not meant to be an exhaustive example of a contact oriented user interface facilitating event driven permissive sharing of information in accordance with aspects of the subject disclosure. Numerous other user interface elements or permutations of those presented can be included in nearly any combination to facilitate access to the various designated shared information subject to a system transitioning of a trigger value. While the first information and interaction segment 410 illustrates a temporal trigger, other types of trigger values can be employed, such as, locations, event counts, proximities values, etc.

Figure 5:
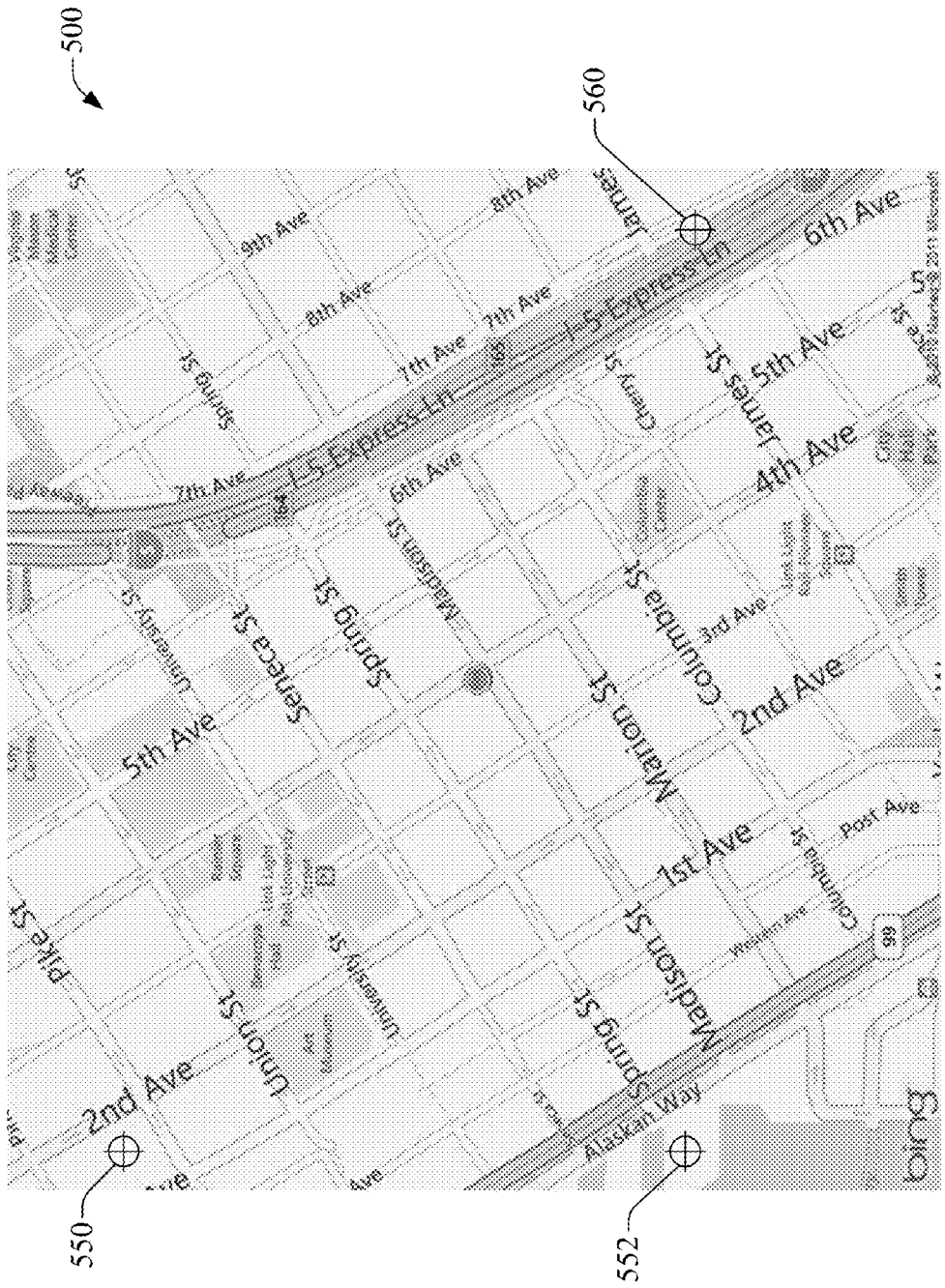
FIG. 5 is a depiction of a user interface that facilitates event driven permissive sharing of information in accordance with aspects of the subject disclosure.

FIG. 5 is a depiction of a user interface 500 that facilitates event driven permissive sharing of information in accordance with aspects of the subject disclosure. User interface 500 illustrates a map that can be presented, for example, on a device display. User interface 500 includes indicators of three locations (550, 552, and 560) associated with the locations of UEs in a friend-type relationship with the device associated with the display presenting user interface 500.

Location indicator 550 can be an indicator of a location for a UE in a first event driven permissive sharing of information relationship. Indicator 550 can be associated with the level of granularity designated for the information associated with the first event driven permissive sharing of information relationship. As an example, where the level of granularity is designated as no finer than a 100 meter radius, then the indicator would be expected to indicate a location within 100 meters of the actual location of the device in the first event driven permissive sharing of information relationship. Further, where an event trigger occurs, the location information associated with indicator 550 can become stale where the location information is not further updated as a result of restricting access to the shared information for the first event driven permissive sharing of information relationship.

Location indicator 552 can be an indicator of a location for a UE in a second event driven permissive sharing of information relationship. Indicator 552 can be associated with the level of granularity designated for the information associated with the second event driven permissive sharing of information relationship. As an example, where the level of granularity is designated as no finer than indicating a city, then the indicator would be expected to indicate a location within the city that the device is in, for the second event driven permissive sharing of information relationship.

Location indicator 560 can be an indicator of a location for a UE in a more conventional permissive sharing of information relationship. Indicator 560 can be associated with a level of granularity designated for the information associated with the more conventional long-term information sharing relationship. Moreover, where the more conventional long-term information sharing relationship is not associated with trigger events, indicator 560 would be expected to remain up to date under normal conditions. Location indicator 560 can be presented simultaneously with location indicators for event driven permissive sharing of information relationship, e.g., 550 and 552, illustrating that the disclosed subject matter can be backwards compatible with legacy information sharing services.

Figure 6:
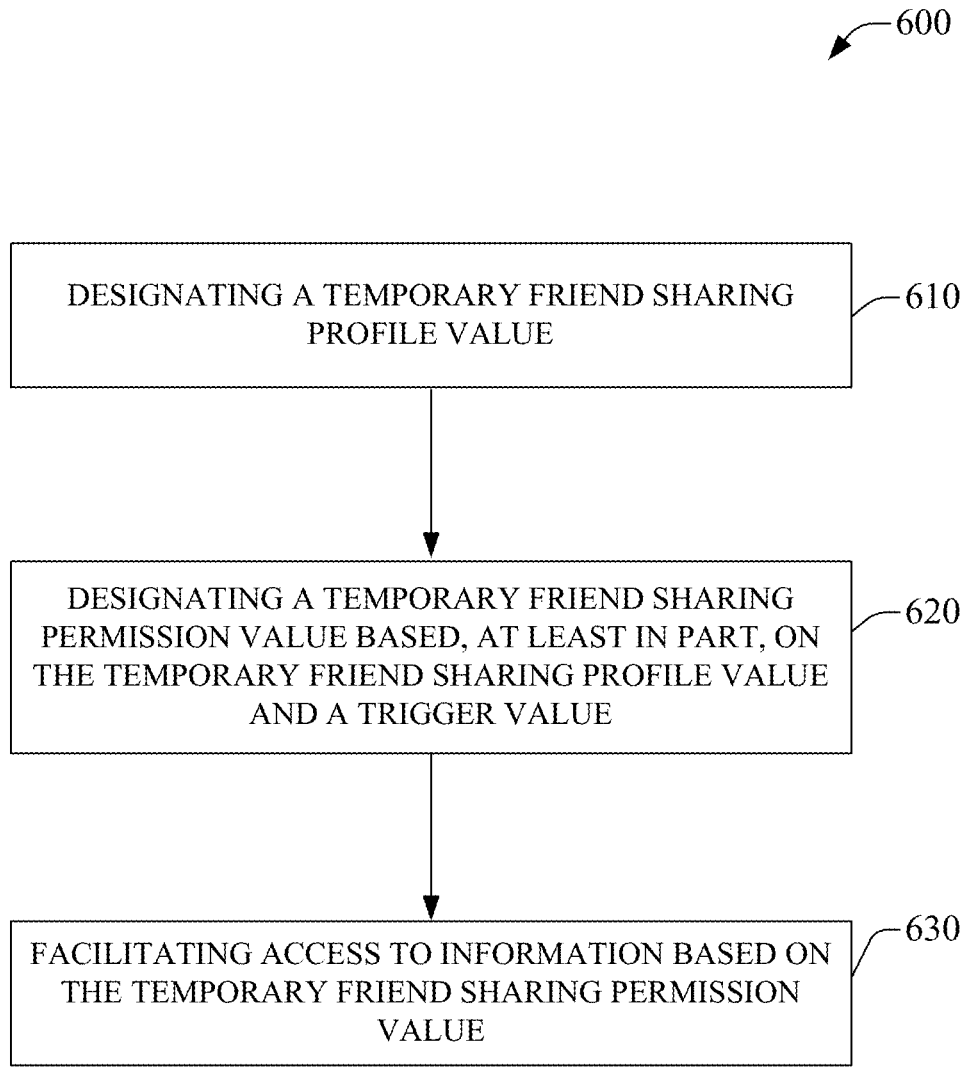
FIG. 6 illustrates a method facilitating event driven permissive sharing of information in accordance with aspects of the subject disclosure.
Figure 7:
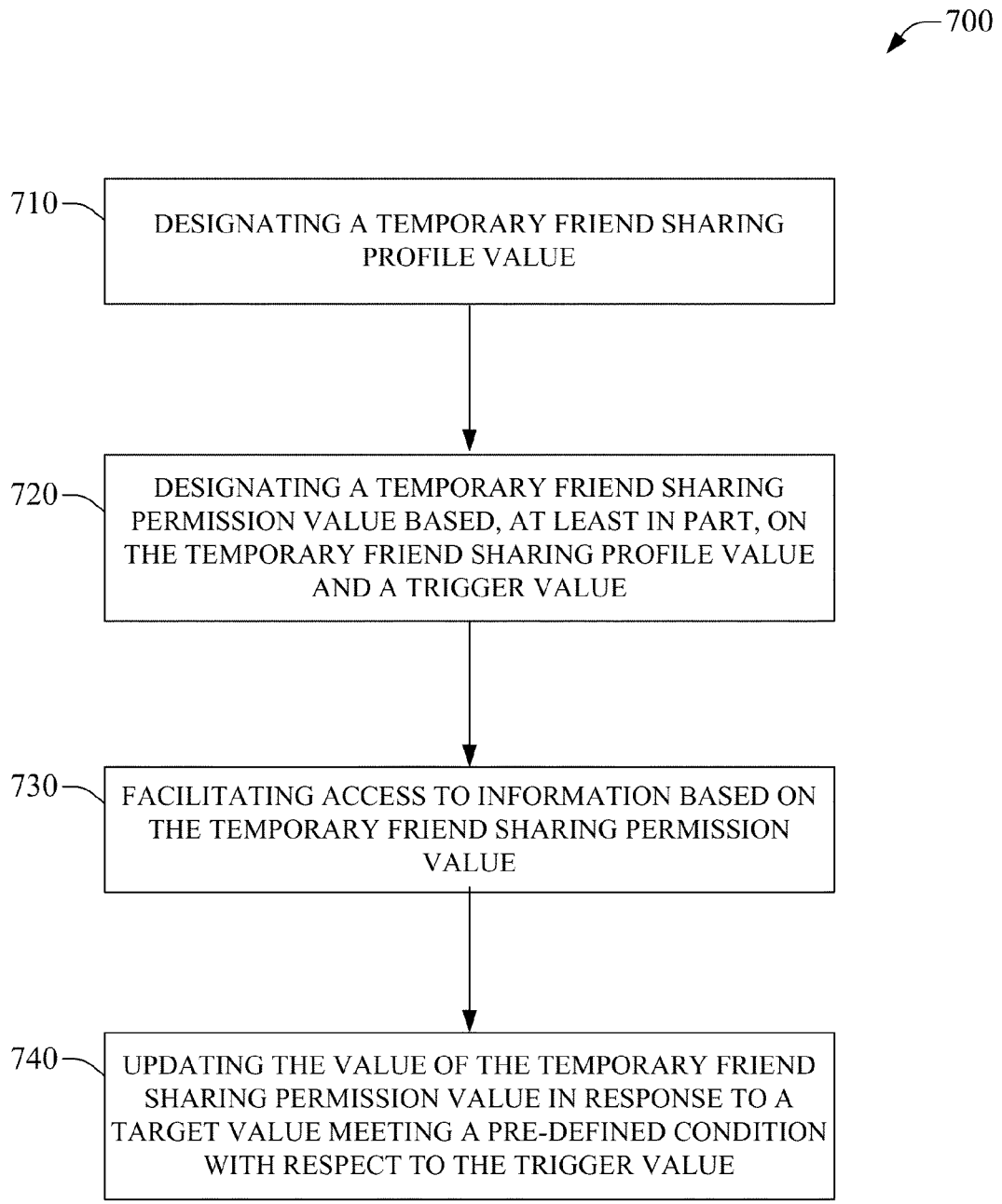
FIG. 7 illustrates a method for facilitating event driven permissive sharing of information in accordance with aspects of the subject disclosure.
Figure 8:
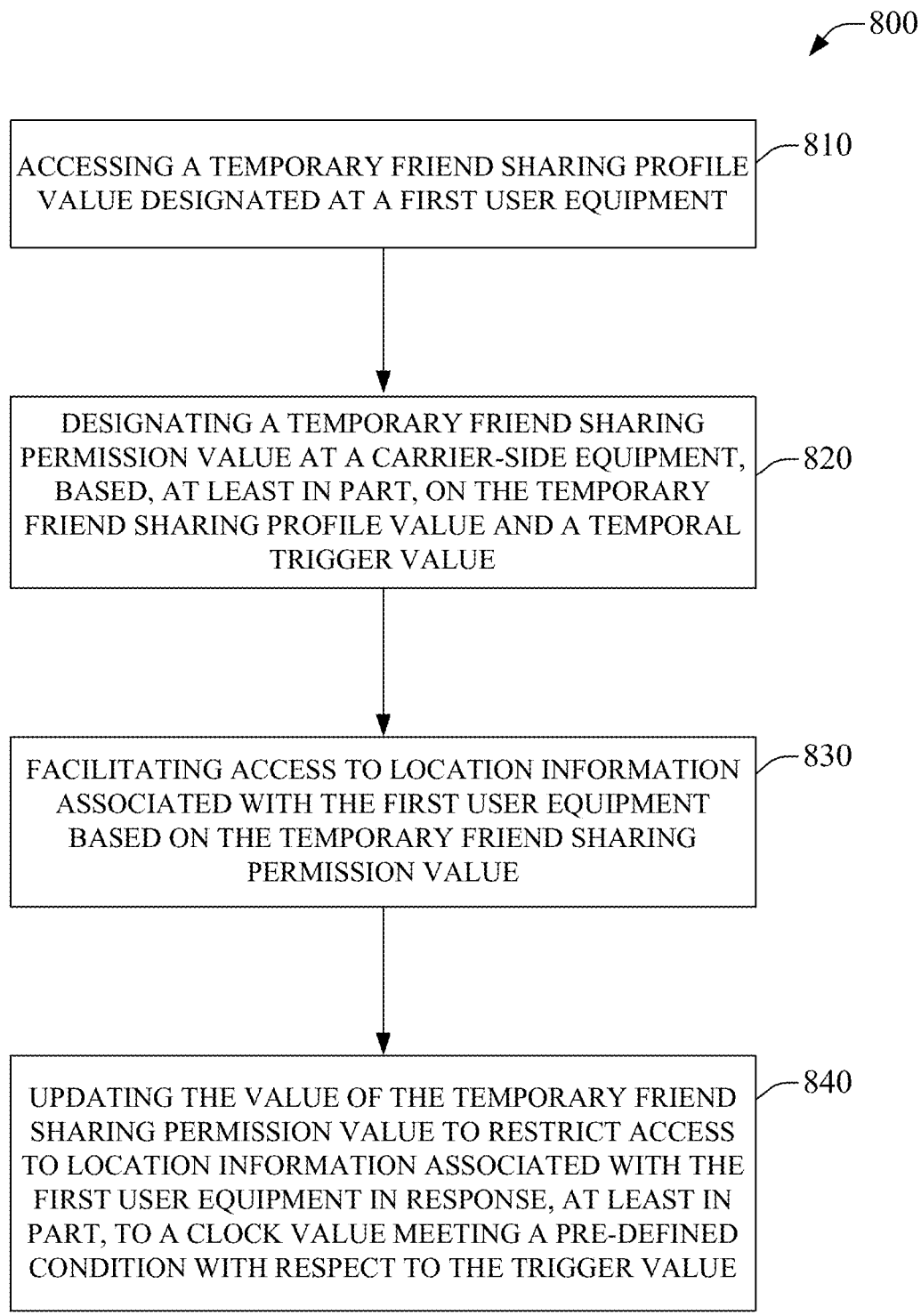
FIG. 8 illustrates a block diagram of an exemplary embodiment of an event driven permissive sharing of location information to implement and exploit one or more features or aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating event driven permissive sharing of information in accordance with aspects of the subject disclosure. At 610, a temporary friend sharing (TFS) profile value can be designated. TFS profile values can include values composing a TFS profile. The TFS profile can define, at least in part, aspects of event driven permissive sharing of information. The TFS profile can be stored on a UE or can be stored on a remote system, such as a carrier-side component. The TFS profile can include designation of trigger event value. A trigger event value can be correlated with automatically transitioning between permitting sharing of designated information and restricting sharing of designated information. As an example, where sharing location information is associated with a temporal trigger event value, sharing of the location information can occur before the trigger time is reached and sharing of the location information can be restricted after the trigger time is reached. As such, the TFS profile can facilitate designating temporary sharing of location information relationships.

At 620, a TFS permission value can be designated. The designated TFS permission value can be based on the TFS profile value and a trigger value. As an example, where a TFS profile value is associated with a target UE and a trigger value is designated as 12 hours, a TFS permission value can be designated that facilitates allowing the target UE to access shared information. Further, notwithstanding other considerations, it can be expected that the TFS permission value will continue to facilitate access to for the target UE to shared information for 12 hours.

At 630, access to information can be facilitated. The information to be accessed can be designated as sharable information. Moreover facilitating access can be based on the TFS permission value from 620. At this point, method 600 can end.

In some embodiments, other TFS profile values can be designated. In an aspect, designating other TFS profile values can be correlated to designating a TFS profile. A TFS profile can include designation of what information can be shared, who or what can access information designated for sharing, and one or more trigger values. As an example, a profile can designate values corresponding to allowing an employer to access location information for a contract employee's UE until the contract is completed, i.e., the trigger value is an indicator of a completed contract or a date on which the contract is designated to complete. In other embodiments, predefined TFS profile schemes can be employed to facilitate application of TFS profile(s) to event driven permissive sharing of information relationships in accordance with aspects of the subject disclosure.

FIG. 7 illustrates a method 700 that facilitates event driven permissive sharing of information in accordance with aspects of the subject disclosure. At 710, a TFS profile value can be designated. At 720, a TFS permission value can be designated. The designated TFS permission value can be based on the TFS profile value and a trigger value. At 730, access to information can be facilitated. The information to be accessed can be designated as sharable information. Moreover facilitating access can be based on the TFS permission value from 720.

At 740, the value of the TFS permission value can be updated. The updating can be in response to a target value meeting a pre-defined condition with respect to the trigger value. In an aspect this can be considered automatically updating the TFS permission value. At this point, method 700 can end. Updating the TFS permission value can be associated with restricting access to information designated as sharable information. In an aspect, by updating the TFS permission value, access to shared information can be restricted without needing to delete or otherwise alter an associated TFS profile. This can be helpful by allowing a user to update a trigger value with the corresponding automatic update of the TFS permission value to reestablish access to shared information without having to input a TFS profile again to reestablish the event driven permissive sharing of information in accordance with aspects of the subject disclosure. Further, where there is integration into other systems of a UE, for example, an address book system (see FIG. 4 for example), an expired trigger value can rapidly be located an updated with just a few taps of a corresponding information and interaction segment. In another aspect, the TFS profile can be removed to restrict access to shared information.

FIG. 8 illustrates an exemplary method 800 that facilitates event driven permissive sharing of location information in accordance with aspects of the subject disclosure. At 810, a TFS profile value can be designated at a first UE. At 820, a TFS permission value can be designated at a carrier-side component that is communicatively coupled to the first UE. Carrier-side components can be components that are part of a carrier network or are closely associated therewith. The designated TFS permission value can be based on the TFS profile value and a temporal trigger value. At 830, access to location information associated with the first UE can be facilitated. The location information to be accessed can be designated as sharable information. Moreover facilitating access can be based on the TFS permission value from 820. As an example, at 830, a second UE can access location information associated with the first UE. In an aspect this can be associated with the first UE providing location information designated as sharable information to a carrier-side system whereby the second UE can seek access to the location information by presenting credentials to the carrier-side system that correspond to the TFS permission value from 820. Continuing the example, the location information for the first UE can then be made accessible to the second UE.

At 840, the value of the TFS permission value can be updated. The updating can be in response to a clock value meeting a pre-defined condition with respect to the temporal trigger value. At this point, method 800 can end. Updating the TFS permission value can be associated with restricting access to location information designated as sharable information.

Figure 9:
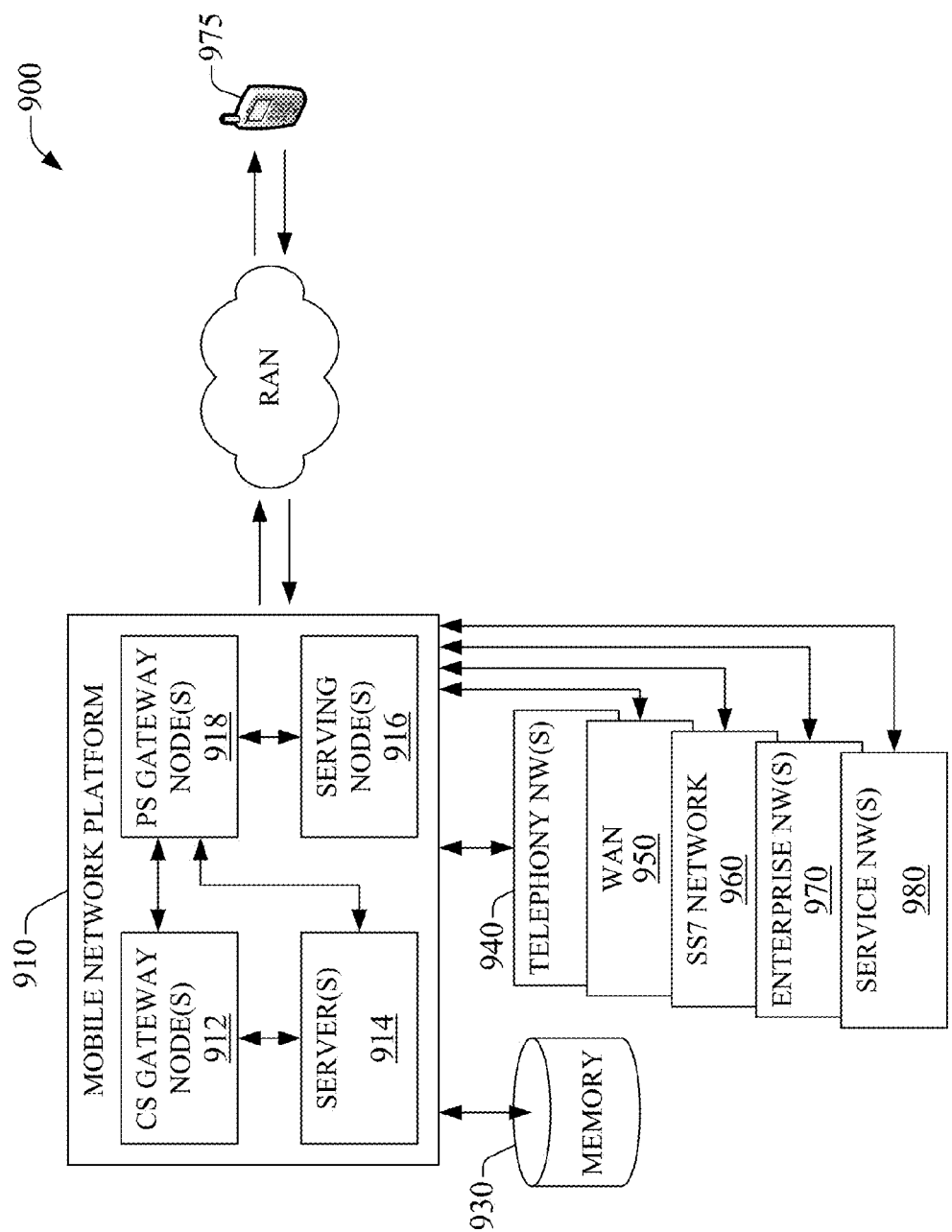
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject innovation described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
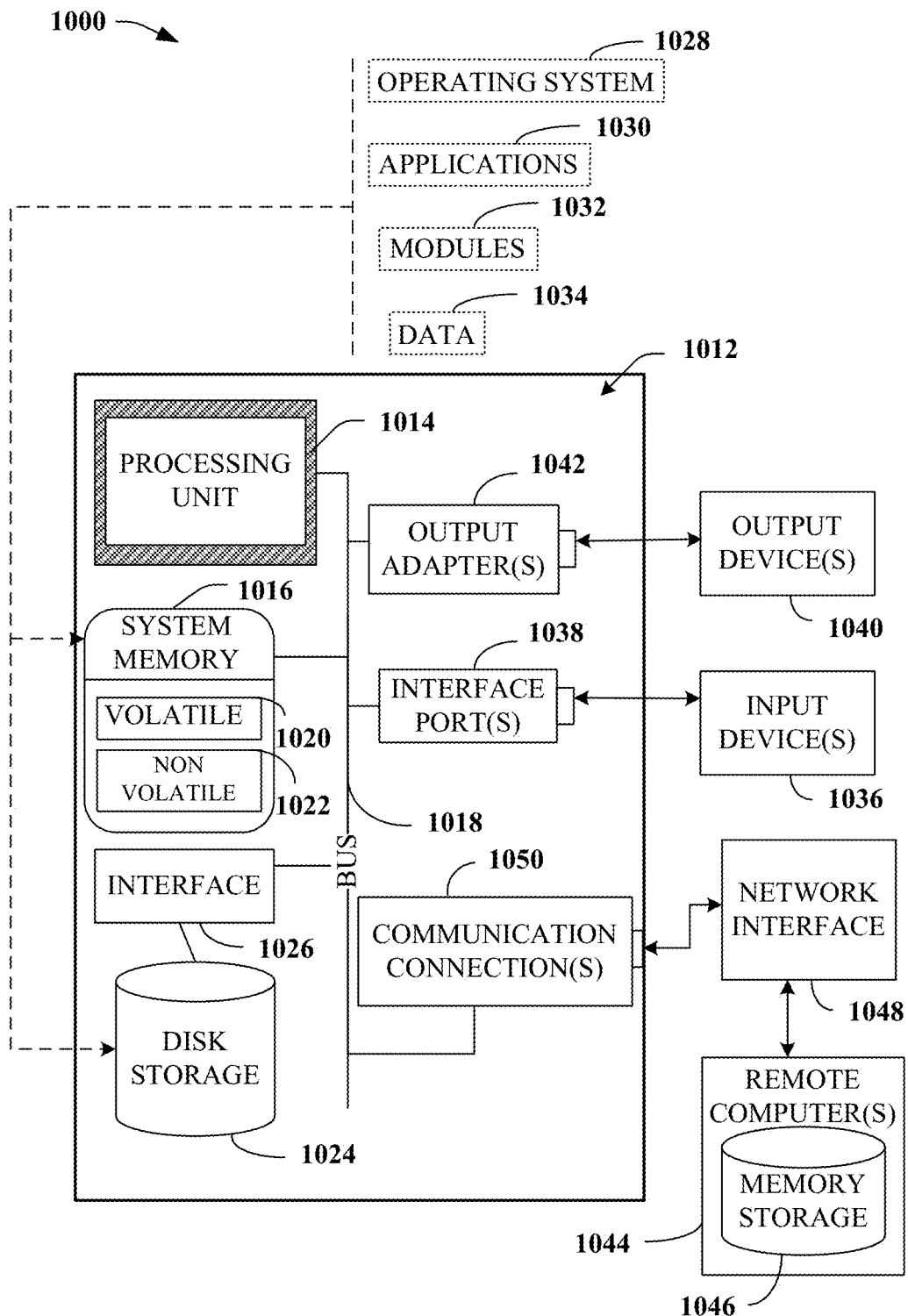
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of a UE (e.g., 110, 210, 310, etc.), a carrier-side component, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028 (e.g., OS component(s) 312, etc.) Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, user interface 400 and 500 can be embodied in a touch sensitive display panel allowing a user to interact with computer 1012 such as by tapping section 410, 412, or 414, etc. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femtocell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store executable instructions; and
a processor, coupled to the memory, that facilitates execution of the executable instructions to perform operations, comprising:
receiving input corresponding to an information sharing profile associated with contact information related to a user identity;
designating a first value, related to a temporal-expiration condition, for a first property of the information sharing profile based on user-designated information;
designating a second value, related to identification of sharable data, for a second property of the information sharing profile based on the input;
designating a third value, related to a designated granularity of the sharable data, for a third property of the information sharing profile based on the input;
identifying the sharable data based on the second property;
determining a subset of the sharable data based on the third property;
updating a permission value in response to the first value transitioning a designated trigger value; and
facilitating access to the subset of sharable data based on satisfaction of a condition related to the permission value.

2. The system of claim 1, wherein the operations further comprise:
designating a fourth value, related to a fourth property of the information sharing profile based on the input and wherein access to the subset of sharable data is further based on satisfaction of another condition related to the fourth property.

3. The system of claim 1, wherein the first value is an elapsed time value.

4. The system of claim 1, wherein the first value is a time on a specified date.

5. The system of claim 2, wherein the fourth value is a spatial value.

6. The system of claim 2, wherein the fourth value is a proximity value.

7. The system of claim 2, wherein the fourth value is a geographic value.

8. The system of claim 1, wherein the second value is associated with identification of location information to share with the user identity.

9. The system of claim 1, wherein the contact information is associated with a user interface that facilitates access to the contact information and facilitates editing the contact information.

10. The system of claim 1, wherein the second value is associated with identification of schedule information to share.

11. The system of claim 1, wherein the second value is associated with identification of services information to share.

12. The system of claim 1, wherein the contact information comprises information related to a plurality of devices related to the user identity, wherein access to the subset of sharable data by the user identity is facilitated via a subset of the plurality of devices based on the information related to the plurality of devices.

13. The system of claim 12, wherein the contact information is associated with a user interface that facilitates access to the information related to the plurality of devices, facilitates editing of the information related to the plurality of devices, and facilitates designation of the subset of the plurality of devices.

14. The system of claim 1, wherein the operations further comprise restricting access to another subset of the sharable data based on a criterion related to a privacy setting, wherein the restricting overrides access to the other subset of sharable data, and wherein access to the other subset of data is blocked.

15. A method, comprising:
accessing, by a system comprising a processor, a sharing profile associated with contact information related to an entity;
designating, by the system, a permission value based on a first value of the sharing profile related to a user-selectable temporal-expiration condition, a second value of the sharing profile related to identifying sharable data, and a third value of the sharing profile related to designating a granularity of the sharable data;
identifying, by the system, the sharable data based on the second value;
determining, by the system, a subset of the sharable data based on the third value;
facilitating, by the system, access to the subset of sharable data for the entity in response to another condition related to the permission value being determined to be satisfied; and
updating, by the system, the permission value in response to a trigger value transitioning the first value.

16. The method of claim 15, further comprising restricting access to the subset of sharable data in response to the updated.

17. The method of claim 15, wherein the facilitating the access to the subset of sharable data comprises facilitating access to location information.

18. The method of claim 15, wherein the designating the permission value is further based on a fourth value of the sharing profile related to a spatial condition.

19. A mobile device, comprising:
a memory to store executable instructions; and
a processor, coupled to the memory, that facilitates execution of the executable instructions to perform operations, comprising:
receiving input corresponding to an information sharing profile associated with contact information related to a user identity associated with a device other than the mobile device;
assigning, to a first property of the information sharing profile, a first value, related to a user-selectable temporal-expiration condition, based on the input, wherein a target time value that transitions the first value is associated with a permission value related to restricting access to designated sharable information;
assigning, to a second property of the information sharing profile, a second value, related to designation of sharable information, based on the input, wherein the second property facilitates the designation of the sharable information;
assigning, to a third property of the information sharing profile, a third value, related to a designated granularity of the sharable information, based on the input, wherein the third property facilitates designation of a subset of the sharable information;
restricting access to the subset of the sharable information for the user identity based on the permission value and the information sharing profile comprising the first property, the second property, and the third property; and
updating the permission value in response to a time value transitioning the first value.

20. The mobile device of claim 19, wherein the operations further comprise:
assigning, to a fourth property of the information sharing profile, a fourth value, related to a spatial condition, based on the input, wherein a target spatial value that transitions the fourth value is associated with the restricting the access to the subset of the sharable information; and
accessing an existing privacy setting of the mobile device to facilitate further limiting of the access to the subset of the sharable information based on the existing privacy setting.

* * * * *